United States Patent
Su

(10) Patent No.: US 7,801,212 B2
(45) Date of Patent: Sep. 21, 2010

(54) VIDEO PLAYING DEVICE AND CONTROL METHOD FOR SETTING PLAYING ENVIRONMENT THEREOF

(75) Inventor: Ian Su, Shindian (TW)

(73) Assignee: Via Technologies, Inc., Taipei (TW)

( * ) Notice: Subject to any disclaimer, the term of this patent is extended or adjusted under 35 U.S.C. 154(b) by 1289 days.

(21) Appl. No.: 11/330,221

(22) Filed: Jan. 12, 2006

(65) Prior Publication Data
US 2006/0153306 A1 Jul. 13, 2006

(51) Int. Cl.
*H04B 1/66* (2006.01)
(52) U.S. Cl. ............... 375/240; 348/560; 348/739
(58) Field of Classification Search ............ 375/240, 375/240.01, 240.29; 348/560, 563, 739, 348/791, 792
See application file for complete search history.

(56) References Cited

U.S. PATENT DOCUMENTS 6,489,933 B1 * 12/2002 Ishibashi et al. ............ 345/1.1
6,664,970 B1 * 12/2003 Matsushita ................. 345/581

FOREIGN PATENT DOCUMENTS

JP 9-284140 A 10/1997

* cited by examiner

*Primary Examiner*—Dac V Ha
(74) *Attorney, Agent, or Firm*—Birch, Stewart, Kolasch & Birch, LLP

(57) ABSTRACT

A video playing device includes a TV encoding circuit, a pre-setting circuit, and a video processing circuit. The TV encoding circuit encodes a first picture and generates a VSYNC signal. The pre-setting circuit is electrically connected with the TV encoding circuit, and receives the VSYNC signal to set a pre-setting signal. The pre-setting signal is enabled before the TV encoding circuit encodes a second picture. The video processing circuit is electrically connected with the pre-setting circuit, and receives the pre-setting signal to execute a video setting process for setting the video playing device to play the second picture. The video setting process is completed before the second picture is encoded. The pre-setting signal is adjustable such that the video setting process is completed before the second picture is played.

13 Claims, 9 Drawing Sheets

US 7,801,212 B2

VIDEO PLAYING DEVICE AND CONTROL METHOD FOR SETTING PLAYING ENVIRONMENT THEREOF

BACKGROUND OF THE INVENTION

1. Field of Invention

The invention relates to a video playing device and a control method thereof, and, in particular, to a digital video playing device and a control method for setting a playing environment such that digital video data can be displayed in real time.

2. Related Art

As a digital video system processes a lot of video data, the video data is compressed in order to facilitate the transmission. When the compressed video data is played on a display device of the digital video system, the compressed video data must be decompressed by a video player of the digital video system and then the video data is transferred to the display device for displaying.

In order to match with the television (TV) specification, the digital video data may be converted into a full picture by way of progressive scan or interlaced scan. The progressive scan means that a full frame is depicted in the order from top to bottom. For example, the VCD system performs the compression and decompression by using this scanning method in conjunction with the MPEG-1 specification. The interlaced scan is to divide a full frame into an odd field and an even field, and the odd field and the even field are respectively depicted in the order from top to bottom. For example, the DVD system performs the compression and decompression by using this scanning method in conjunction with the MPEG-2 specification. However, the resolution of the interlaced scan is lower than that of the progressive scan. In order to solve this problem, the resolution of the played video may be increased by de-interlacing the interlaced video data.

Referring to FIG. 1, a conventional video player 1 includes a decoder 11, a buffer 12, a controller 13 and a TV encoder 14. After the compressed video data is transferred to the decoder 11, the video data recovered by the decoder 11 reproduces a frame (or a field) stored in one of regions 121 to 12n in the buffer 12. The controller 13 executes a video setting process 131 to generate a setting parameter including a size of the frame (or field) to be encoded by the TV encoder 14, a scanning method (a progressive scan or an interlaced scan), whether the de-interlaced scan is needed, and the frame (or field) in which one of the regions 121 to 12n has to be read for encoding. In addition, the TV encoder 14 regularly generates a vertical sync (VSYNC) signal and a horizontal sync (HSYNC) signal, and reads the frame (or field) for encoding from a prescribed one of the regions 121 to 12n according to the video setting parameter. That is, the VSYNC signal and the HSYNC signal are simultaneously combined into a video signal 141. Thereafter, the TV encoder 14 outputs the video signal 141 for displaying the video data.

However, if the video setting process 131 generates and transfers the setting parameter to the TV encoder 14 in advance, and the decoder 11 does not decompress the corresponding frame, the TV encoder 14 might generate an incorrect video signal 141. In other words, if the video setting process 131 generates and transfers the setting parameter to the TV encoder 14 laggardly, and the decoder 11 has decompressed the subsequent frame, the TV encoder 14 might generate the incorrect video signal 141. In both of the conditions, the display might display an incorrect picture. In order to avoid displaying such incorrect pictures, the controller 13 should complete the video setting process 131 and generate the corresponding setting parameters at the time when the frame has been decoded but not encoded by the TV encoder 1. Therefore, the TV encoder 14 can generate the correctly encoded video signal 141 and the video can be played correctly.

SUMMARY OF THE INVENTION

In view of the foregoing, the invention is to provide a video playing device and a control method for setting a playing environment correctly such that video data can be displayed in real time.

To achieve the above, a video playing device of the invention includes a TV encoding circuit, a pre-setting circuit and a video processing circuit. The TV encoding circuit generates a vertical sync signal and encodes a first picture for displaying. The pre-setting circuit is electrically connected with the TV encoding circuit and receives the vertical sync signal to set a pre-setting signal. The pre-setting signal is enabled before the TV encoding circuit encodes a second picture. The video processing circuit is electrically connected with the pre-setting circuit and receives the pre-setting signal to execute a video setting process. During the video setting process, the video playing device is set to provide an environment adapted to play the second picture before it is encoded.

To achieve the above, the invention also discloses a control method for setting a playing environment of a video playing device. The control method includes the steps as follows. Firstly, a vertical sync signal is generated and encoded by a first picture. A pre-setting signal set is enabled before a second picture is encoded according to the vertical sync signal. A video setting process is executed for setting the video playing device to play the second picture before the second picture is encoded according to the pre-setting signal.

As mentioned above, the pre-setting signal is asserted to control the video processing circuit to activate the video setting process before the time that the second picture is encoded in the video playing device and the control method for setting the playing environment thereof. Thus, the video setting process can be completed correctly before the TV encoding circuit encodes the second picture. Consequently, the TV encoder can encode the video signal according to the setting parameter for the second picture, and the second picture can be correctly outputted and played.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
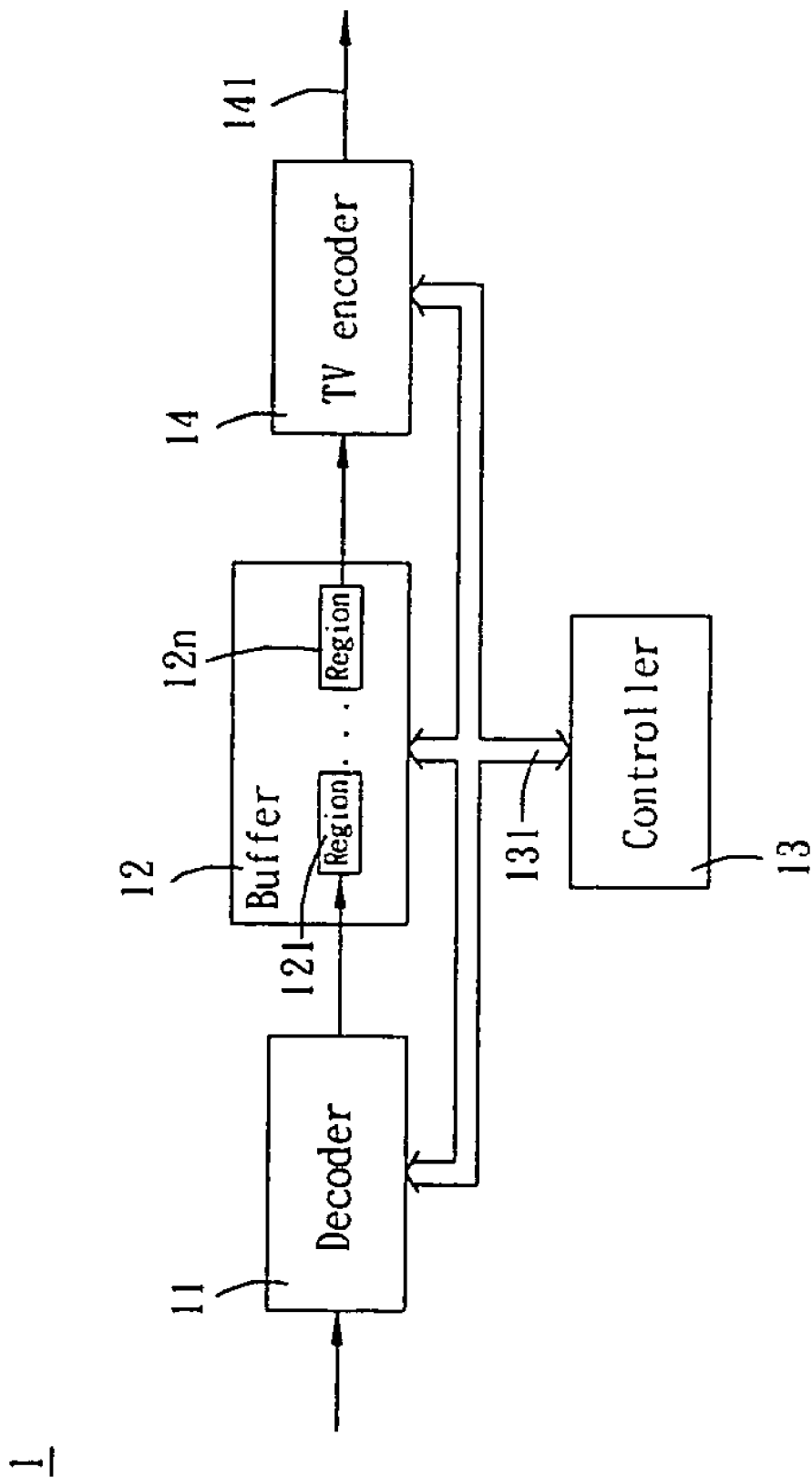
FIG. 1 is a block diagram showing the conventional video player.
Figure 2:
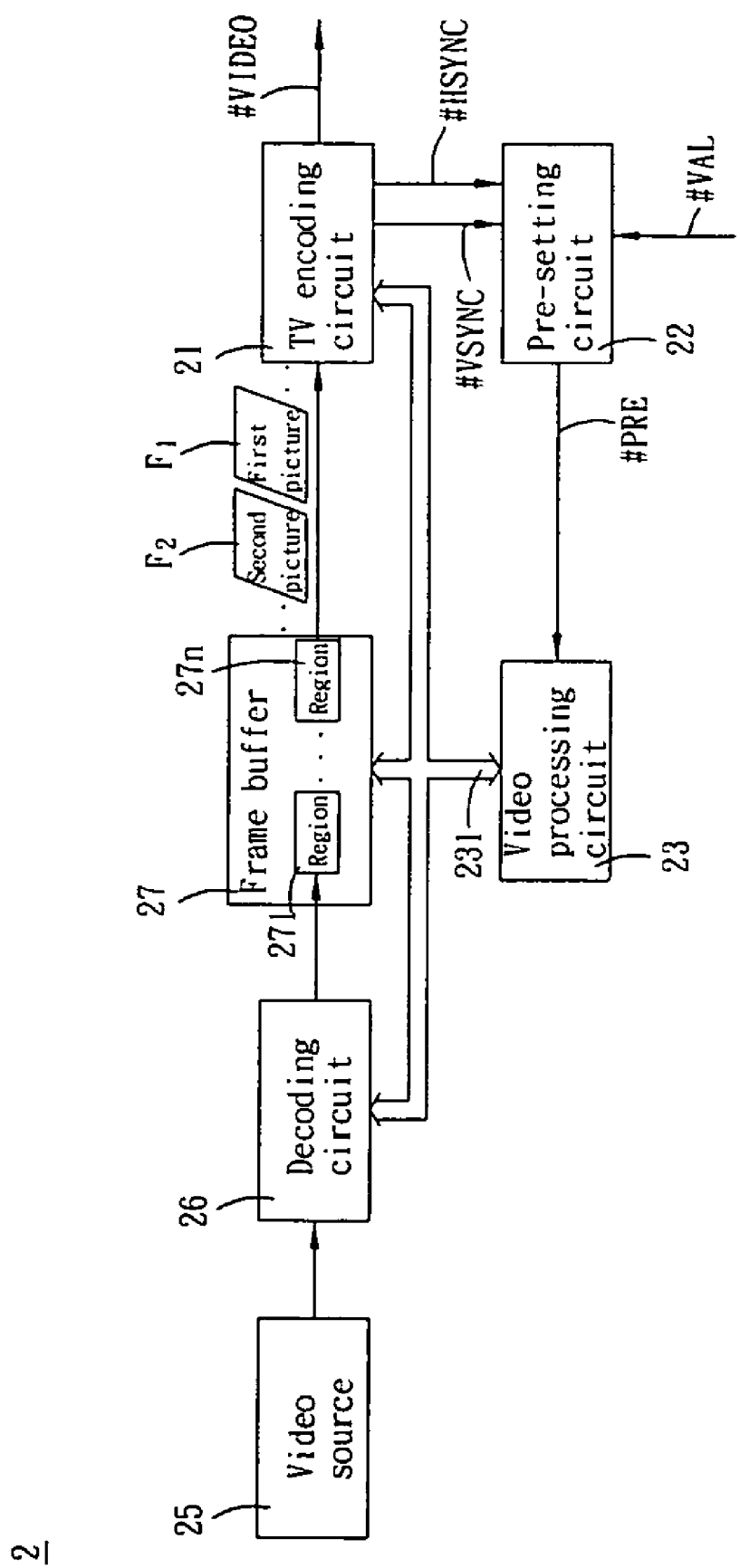
FIG. 2 is a block diagram showing a video playing device according to an embodiment of the invention.
Figure 3:
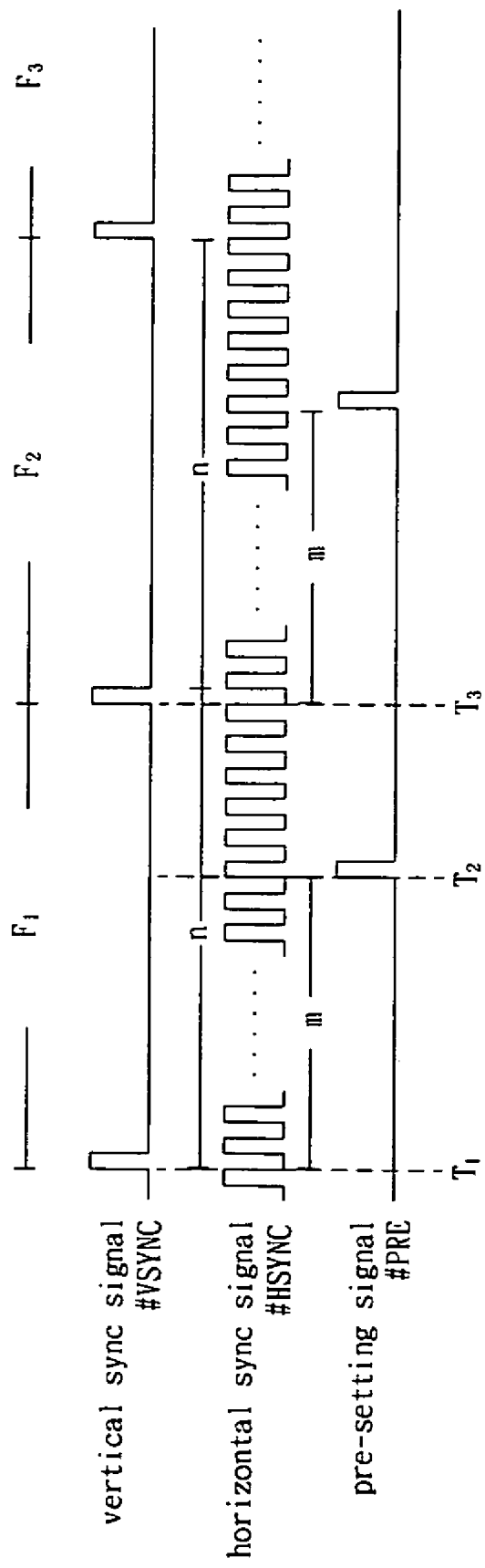
FIG. 3 shows waveforms of various signals in FIG. 2.

Referring to FIG. 2, a video playing device 2 includes a TV encoding circuit 21, a pre-setting circuit 22 and a video processing circuit 23. In this embodiment, the pre-setting circuit 22 is electrically connected with the TV encoding circuit 21, and the video processing circuit 23 is electrically connected with the pre-setting circuit 22. Herein, the TV encoding circuit 21 regularly generates a vertical sync signal #VSYNC and a horizontal sync signal #HSYNC. When the TV encoding circuit 21 encodes a first picture $F_1$ and generates the vertical sync signal #VSYNC and the horizontal sync signal #HSYNC, the pre-setting circuit 22 receives the vertical sync signal #VSYNC to generate a pre-setting signal #PRE enabled before the TV encoding circuit 21 encodes a second picture $F_2$, as shown in FIG. 3.

Next, the video processing circuit 23 receives the pre-setting signal #PRE and then executes a video setting process 231 for generating a setting parameter, which includes the size of the frame (or field) to be encoded by the TV encoding circuit 21, the scanning method (progressive scan or interlaced scan), whether the de-interlaced scan is needed, and the likes. The TV encoding circuit 21 sets a playing environment for the second picture $F_2$ according to the setting parameter while encoding the second picture $F_2$, and then combines the vertical sync signal #VSYNC with the horizontal sync signal #HSYNC to generate a video signal #VIDEO. After that, the TV encoding circuit 21 outputs the video signal #VIDEO to the display for displaying the picture, such that the video playing device 2 can play the second picture $F_2$.

Because the pre-setting signal #PRE is enabled at the time between the time when the first picture $F_1$ is encoded and the time when the second picture $F_2$ is enabled, and the pre-setting signal #PRE enables the video processing circuit 23 to perform the video setting process 231 before the TV encoding circuit 21 encodes the second picture $F_2$, the TV encoding circuit 21 can encode and play the second picture $F_2$ correctly.

Referring again to FIG. 2, the video playing device 2 of this embodiment further includes a video source 25, a decoding circuit 26 and a frame buffer 27. In this embodiment, the video source 25 provides compressed video data. Herein, the video source 25 may be implemented by, without limitation to, the compressed video data of the MPEG or H.26x specification outputted from an optical drive or a network receiving port. In addition, the decoding circuit 26 electrically connected with the video source 25 receives and decodes the compressed video data provided by the video source 25 and then stores the video data in the frame buffer 27. The pictures in the video data are respectively stored in the regions 271 to 27n. Furthermore, the video processing circuit 23 may be implemented by, without limitation to, a digital controller or a processor.

As shown in FIGS. 2 and 3, the television picture is composed of n signal lines, and the TV encoding circuit 21 regularly generates the vertical sync signal #VSYNC and the horizontal sync signal #HSYNC, which is enabled n times in one cycle of the vertical sync signal #VSYNC. Thus, each signal line of the television can be updated according to the vertical sync signal #VSYNC and the horizontal sync signal #HSYNC during two sequential pictures.

In a non-interlaced display, for example, each time when the vertical sync signal #VSYNC represents the picture (frame) is updated. When the horizontal sync signal #HSYNC is enabled, the signal lines in this picture are sequentially updated. In an interlaced display, for example, the picture (field) is updated each time when the vertical sync signal #VSYNC is enabled. When the odd field is updated into the even field, the horizontal sync signal #HSYNC is enabled and the even-numbered signal lines in the picture are sequentially updated. When the even field is updated into the odd field, the horizontal sync signal #HSYNC is enabled and the odd-numbered signal lines in the picture are sequentially updated.

In order to illustrate the first picture $F_1$, the video setting process 231 and the second picture $F_2$ and the associated processing procedures more clearly, please refer again to FIG. 3. The TV encoding circuit 21 starts to encode a first picture $F_1$ to generate the video signal #VIDEO at time $T_1$. At this time, when the vertical sync signal #VSYNC is enabled at time $T_1$, the pre-setting circuit 22 receives a reference parameter #VAL, which may be inputted to a memory manually in advance. The pre-setting circuit 22 can read the reference parameter #VAL from this memory. The pre-setting circuit 22 takes the cycle of the horizontal sync signal #HSYNC as one calculation unit, and sets the phase difference between the pre-setting signal #PRE and the vertical sync signal #VSYNC according to the reference parameter #VAL.

When the reference parameter #VAL is m, the pre-setting signal #PRE is set after m cycles of the horizontal sync signal #HSYNC. That is, the pre-setting signal #PRE is enabled at time $T_2$. At this time, the pre-setting signal #PRE interrupts other operations being executed by the video processing circuit 23, and makes the video processing circuit 23 execute the video setting process 231 immediately. The setting of the reference parameter #VAL has to consider whether the decoding circuit 26 has decompressed a to-be-encoded picture and stores the decompressed result in the frame buffer 27, as well as whether the video setting process 231 can be completed before the second picture $F_2$ is played (i.e., at time $T_3$).

In addition, the setting parameter in the video setting process 231 also includes the setting of the TV encoding circuit 21 of the to-be-encoded second picture $F_2$ (frame or field) in which one of the regions 271 to 27n of the frame buffer 27 has to be read out and encoded. Accordingly, the TV encoding circuit 21 can correctly encode the second picture $F_2$ and output the encoded result.

Figure 4:
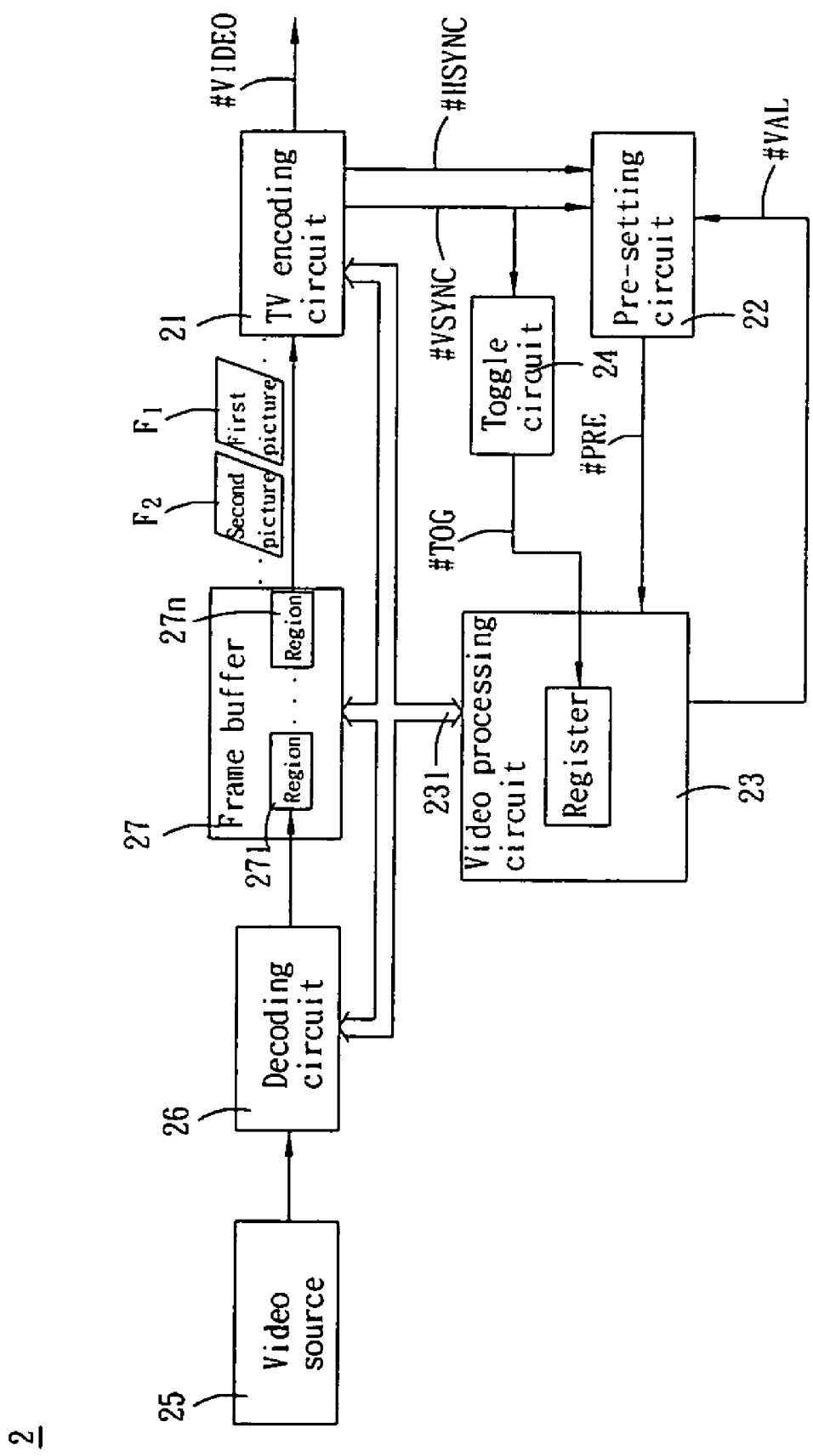
FIG. 4 is a block diagram showing a video playing device according to another embodiment of the invention.
Figure 5:
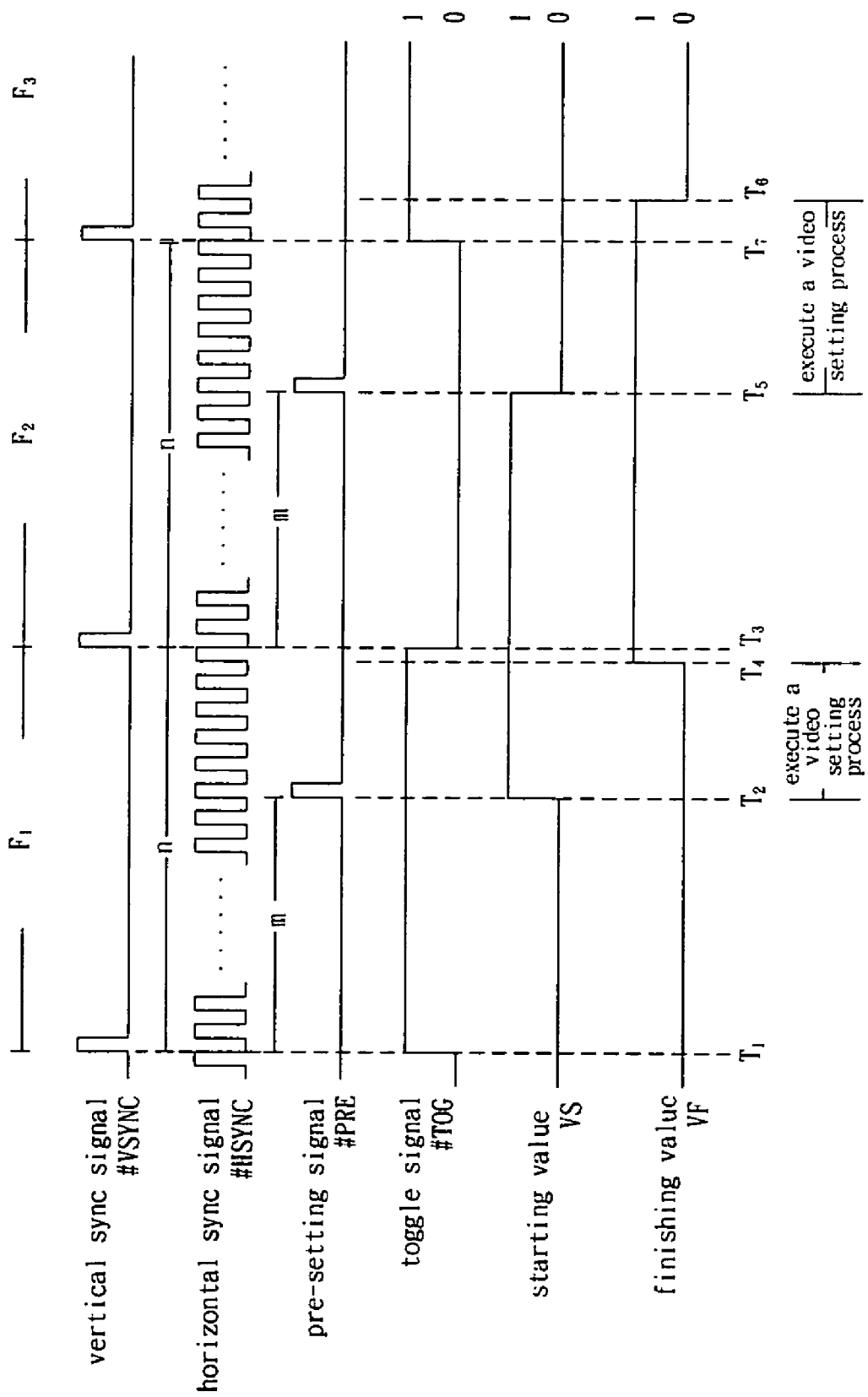
FIGS. 5 and 6 show waveforms of the signals in FIG. 4.

As shown in FIGS. 4 and 5, the video playing device 2 according to another embodiment further includes a toggle circuit 24, which is electrically connected with the TV encoding circuit 21 and outputs a toggle signal #TOG. The toggle signal #TOG is alternately updated between 0 and 1 according to the vertical sync signal #VSYNC, and the cycle of the toggle signal is twice as much as that of the vertical sync signal.

The video processing circuit 23 electrically connected with the toggle circuit 24 detects a level of the toggle signal #TOG before the video setting process 231 is executed, and takes the level of the detected toggle signal #TOG as a starting parameter VS. In addition, after the video setting process 231 is completed, the video processing circuit 23 again detects the level of the toggle signal #TOG as a finishing parameter VF. The starting parameter VS and the finishing parameter VF may be stored in a register 232 of the video processing circuit 23.

If the video setting process 231 starts when the first picture $F_1$ is encoded and ends before the second picture $F_2$ has been encoded, the starting parameter VS equal the finishing parameter VF. If the video setting process 231 starts when the first picture $F_1$ is encoded and ends after the second picture $F_2$ has been encoded, the starting parameter VS is unequal to the finishing parameter VF. Thus, comparing the starting parameter VS with the finishing parameter VF can obtain whether the video setting process 231 is completed before or after the second picture is played.

As shown in FIG. 5, the video processing circuit 23 is interrupted by the pre-setting signal #PRE at time $T_2$, sets the starting parameter VS according to the level of the toggle signal #TOG, and then stores the starting parameter VS in a register 232. Next, the video setting process 231 is executed to start setting the second picture $F_2$. At time $T_4$, the video setting process 231 is completed, the finishing parameter VF is set according to the level of the toggle signal #TOG and the finishing parameter VF is stored in the register 232. Because the video setting process 231 is completed before the second picture $F_2$ is played (at time $T_3$), the starting parameter VS and the finishing parameter VF equal 1.

Then, at time $T_5$, the video processing circuit 23 is again interrupted by the pre-setting signal #PRE, sets the starting parameter VS according to the level of the toggle signal #TOG, and stores the starting parameter VS in the register 232. At time $T_6$, the video setting process 231 is completed, the finishing parameter VF is set according to the level of the toggle signal #TOG, and the finishing parameter VF is stored in the register 232. Because the video setting process 231 is completed after a third picture $F_3$ is played, the starting parameter VS is unequal to the finishing parameter VF. At the time between time $T_s$ and $T_6$, because the video setting process 231 starts laggardly, the video setting process 231 cannot be completed before the third picture $F_3$ is played (i.e., before time $T_7$) such that the third picture $F_3$ cannot be correctly played. In order to avoid this condition, the developer can adjust the reference parameter #VAL such that the video setting process 231 starts early and ends before the third picture is played.

Figure 6:
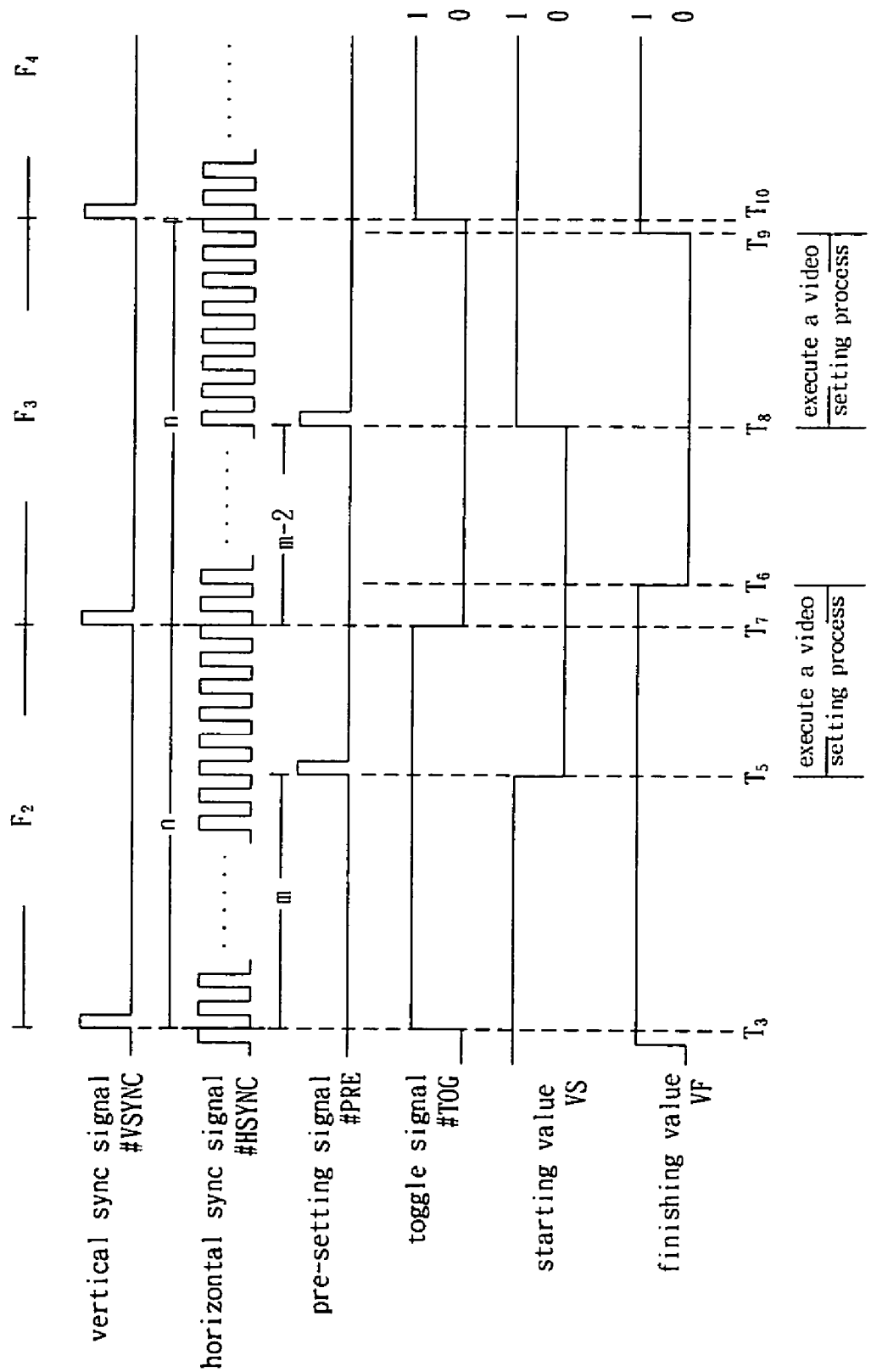

In addition, what is different from FIG. 5 is that the video processing circuit 23 of FIG. 6 can compare the starting parameter VS with the finishing parameter VF to determine whether they are the same at time $T_6$. If they are not the same, the reference parameter #VAL can be automatically modified. In FIG. 6, the reference parameter #VAL is adjusted to be (m−2), the setting time for the third picture $F_3$ is the same as the setting time for the second picture $F_2$. The video setting process 231 sets a fourth picture $F_4$ at the time from time T8 to T9 and is completed before time $T_{10}$ when the fourth picture $F_4$ is encoded. Thus, if the time for executing the video setting process 231 after the third picture $F_3$ is not longer than the setting time for the second picture $F_2$, the picture after the third picture $F_3$ can be correctly set, encoded and displayed.

Figure 7:
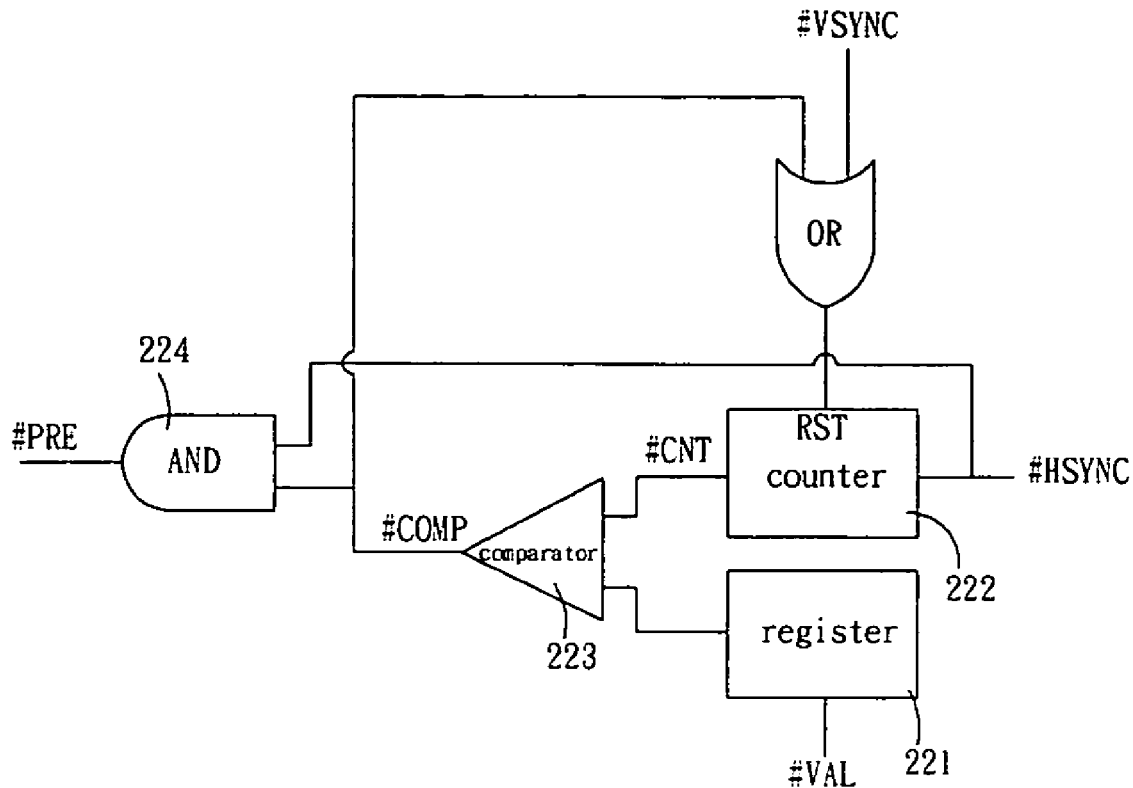
FIG. 7 is a circuit diagram showing a pre-setting circuit of FIG. 4.

Referring to FIG. 7, the pre-setting circuit 22 of this embodiment includes a register 221, a counter 222, a comparator 223, an AND gate 224 and an OR gate 225. The register 221 receives and records the reference parameter #VAL and outputs the reference parameter #VAL to the comparator 223. The counter 222 receives the horizontal sync signal #HSYNC and counts the number of cycles of the horizontal sync signal #HSYNC to generate a count parameter #CNT. When the vertical sync signal #VSYNC triggers the reset end RST of the counter 222, the counter 222 zeros the count parameter #CNT. The counter 222 outputs the count parameter #CNT to the comparator 223, which compares the reference parameter #VAL with the count parameter #CNT and thus generates a comparison parameter #COMP. When the reference parameter #VAL is equal to the count parameter #CNT, the comparison parameter #COMP is 1. At this time, the AND gate 224 ANDs the comparison parameter #COMP with the horizontal sync signal #HSYNC to output the pre-setting signal #PRE. In addition, the OR gate 225 ORs the comparison parameter #COMP with the vertical sync signal #VSYNC. Thus, the counter 222 zeros the count parameter #CNT as long as the comparison parameter #COMP is 1 or the vertical sync signal #VSYNC is enabled in order to ensure that the pre-setting signal #PRE is enabled only when the reference parameter #VAL equals the count parameter #CNT.

Figure 8:
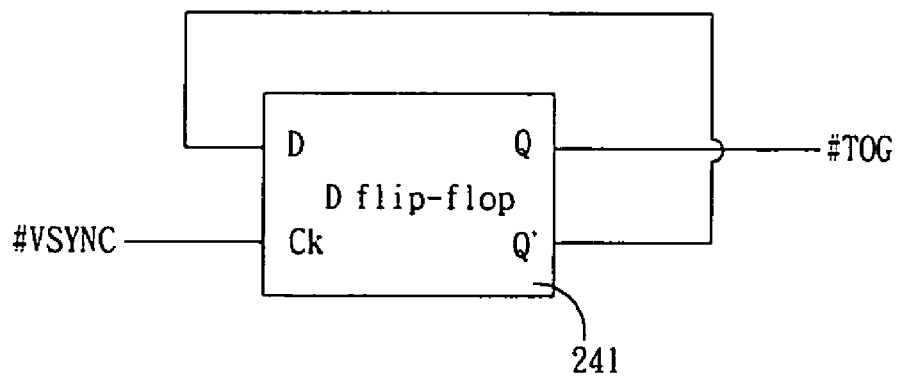
FIG. 8 is a circuit diagram showing a toggle circuit of FIG. 4.

Referring to FIG. 8, the toggle circuit 24 of this embodiment includes a D flip-flop 241 having an output terminal Q', an input terminal D connected to the output terminal Q', a clock input terminal Ck for receiving the vertical sync signal #VSYNC, and an output terminal Q for outputting the generated toggle signal #TOG. When the vertical sync signal #VSYNC is triggered, the state of the output terminal Q of the D flip-flop 241 is changed and the level of the toggle signal #TOG is alternately switched between 0 and 1 according to the trigger of the vertical sync signal #VSYNC.

Figure 9:
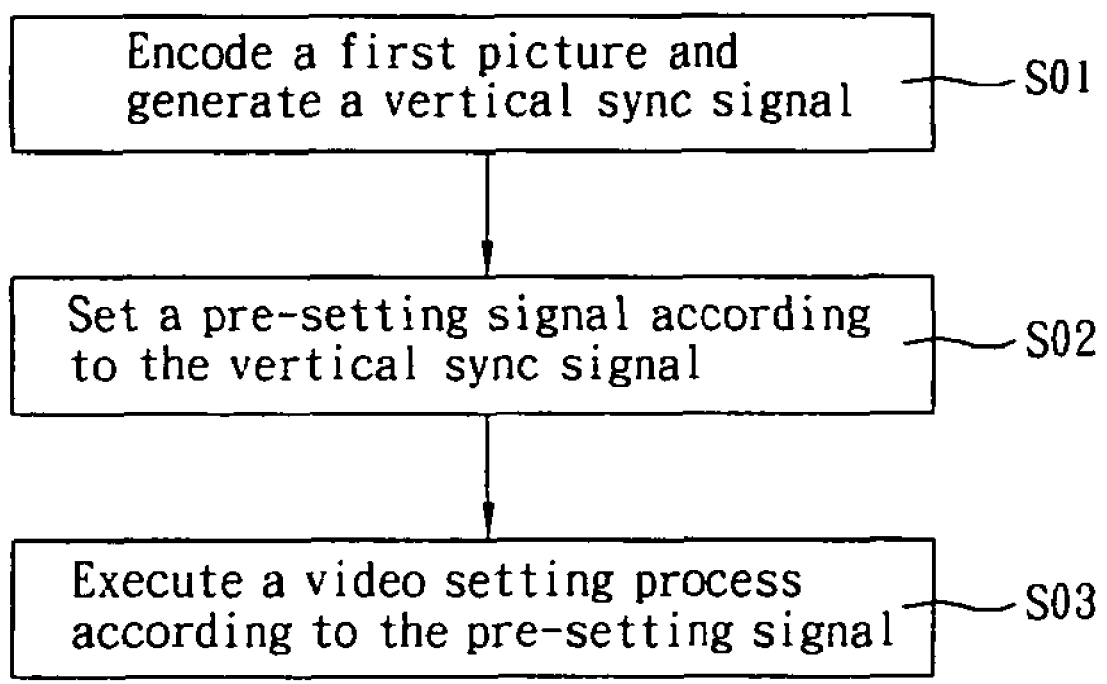
FIG. 9 is a flow chart showing a control method for setting a playing environment of a video playing device according to an embodiment of the invention.

Referring to FIG. 9, the control method of setting a playing environment of the video playing device according to the embodiment of the invention includes steps S01 to S03. First, a first picture is encoded and a vertical sync signal is generated, as shown in step S01. Then, a pre-setting signal, which is enabled before a second picture is encoded, is set according to the vertical sync signal, as shown in step S02. Thereafter, a video setting process for setting the video playing device to play the second picture is executed according to the pre-setting signal, as shown in step S03.

The control method of this embodiment can be applied to the video playing device of the above-mentioned embodiment and can produce the functions and results the same as those of the above-mentioned embodiment. Because the detailed descriptions have been described hereinabove, only the operation procedure of the control method applied to the video playing device will be described hereinafter.

Figure 10:
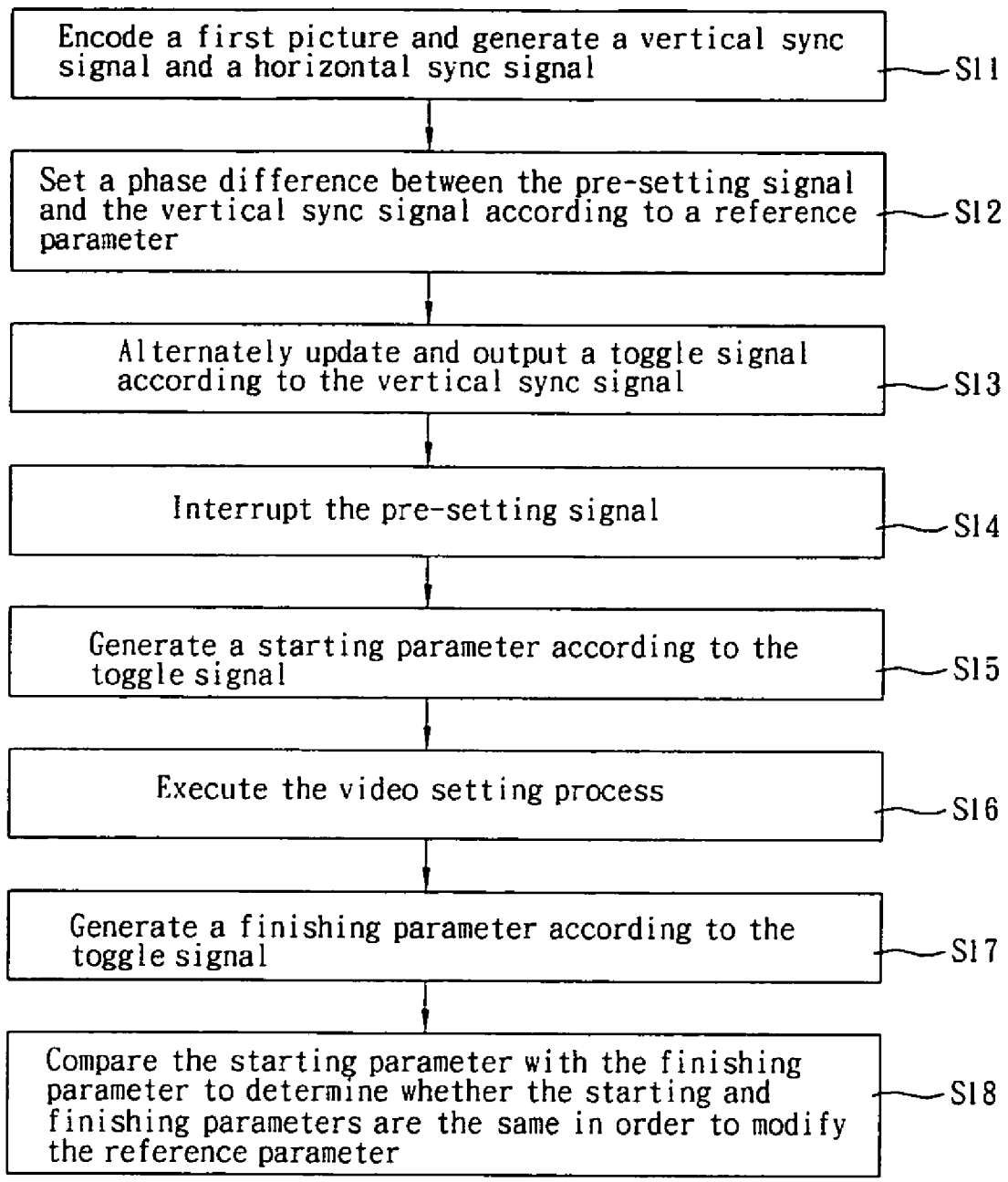
FIG. 10 is a flow chart showing a control method for setting a playing environment of a video playing device according to another embodiment of the invention.

As shown in FIG. 10, the TV encoder encodes a first picture and generates a vertical sync signal and a horizontal sync signal in step S11. Then, the pre-setting circuit sets a phase difference between the pre-setting signal and the vertical sync signal according to reference parameters by taking one cycle of the horizontal sync signal as one unit in step S12. Herein, the pre-setting signal is enabled before the TV encoder encodes a second picture. Next, the toggle circuit alternately updates and outputs a toggle signal, which has the cycle twice that of the vertical sync signal, according to the vertical sync signal in step S13. When the pre-setting signal interrupts the video processing circuit (step S14), the video processing circuit generates a starting parameter according to the toggle signal before executing the video setting process, and records the starting parameter in the register (step S15). After that, the video processing circuit executes the video setting process for setting the video playing device to play the second picture (step S16). After the video setting process is completed, the video processing circuit generates a finishing parameter according to the toggle signal and records the finishing parameter in the register (step S17), and compares the starting parameter with the finishing parameter to determine whether the starting and finishing parameters are the same in order to modify the reference parameter, such that the pre-setting circuit adjusts the enabled time of the pre-setting signal (step S18).

In summary, the pre-setting signal is enabled to indicate that the video setting process can be started before the second picture is encoded in the video playing device and the control method for setting the playing environment thereof according to the invention. Thus, the video setting process can be completed correctly before the second picture is encoded, outputted and played. Consequently, the TV encoder can encode the video signal according to the correct setting parameter for the second picture, and the second picture can be correctly outputted and played such that the user can watch the correct video.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A video playing device, comprising:
   a TV encoding circuit for generating a vertical sync signal and encoding a first picture;
   a pre-setting circuit electrically connected with the TV encoding circuit and receiving the vertical sync signal to set a pre-setting signal, wherein the pre-setting signal is enabled before the TV encoding circuit encodes a second picture; and
   a video processing circuit electrically connected with the pre-setting circuit and receiving the pre-setting signal to execute a video setting process, wherein the video setting process finishes setting the video playing device to play the second picture before the second picture is encoded.

2. The video playing device according to claim 1, wherein the video processing circuit is a digital controller, and the digital controller is interrupted by the pre-setting signal to execute the video setting process.

3. The video playing device according to claim 1, wherein the video setting process sets a size and a scanning method for the TV encoding circuit of the video playing device to encode the second picture.

4. The video playing device according to claim 1, wherein the video setting process sets a frame buffer read by the TV encoding circuit of the video playing device to encode the second picture.

5. The video playing device according to claim 1, wherein the TV encoding circuit generates a horizontal sync signal, the pre-setting circuit receives the horizontal sync signal and a reference parameter, and sets a phase difference between the pre-setting signal and the vertical sync signal according to the reference parameter with taking a cycle of the horizontal sync signal as one unit.

6. The video playing device according to claim 5, further comprising:
   a toggle circuit electrically connected with the TV encoding circuit and outputting a toggle signal, wherein the toggle signal is alternately updated according to the vertical sync signal.

7. The video playing device according to claim 6, wherein the video processing circuit generates a starting parameter according to the toggle signal before the video setting process is executed, and generates a finishing parameter according to the toggle signal after the video setting process is completed, and the video processing circuit compares the starting parameter with the finishing parameter to determine whether the starting parameter is the same as the finishing parameter in order to modify the reference parameter.

8. A control method for setting a playing environment of a video playing device, the method comprising the steps of:
   generating a vertical sync signal and encoding a first picture;
   setting a pre-setting signal according to the vertical sync signal, wherein the pre-setting signal is enabled before a second picture is encoded; and
   executing a video setting process according to the pre-setting signal, wherein the video setting process finishes setting the video playing device to play the second picture before the second picture is encoded.

9. The control method according to claim 8, wherein the video setting process sets a size and a scanning method for the TV encoding circuit of the video playing device to encode the second picture.

10. The control method according to claim 8, wherein the video setting process sets a frame buffer read by the TV encoding circuit of the video playing device to encode the second picture.

11. The control method according to claim 8, wherein the step of setting the pre-setting signal is to set a phase difference between the pre-setting signal and the vertical sync signal according to a reference parameter with taking a cycle of a horizontal sync signal as one unit.

12. The control method according to claim 11, further comprising:
    outputting a toggle signal, wherein the toggle signal is alternately updated according to the vertical sync signal.

13. The control method according to claim 12, further comprising:
    generating a starting parameter according to the toggle signal before the video setting process is executed;
    generating a finishing parameter according to the toggle signal after the video setting process is completed; and
    comparing the starting parameter with the finishing parameter to determine whether the starting parameter is the same as the finishing parameter in order to modify the reference parameter.

* * * * *